US006859295B2

(12) United States Patent
Matsuoka

(10) Patent No.: US 6,859,295 B2
(45) Date of Patent: Feb. 22, 2005

(54) SCANNING OPTICAL SYSTEM

(75) Inventor: Shohei Matsuoka, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/779,643

(22) Filed: Feb. 18, 2004

(65) Prior Publication Data

US 2004/0165241 A1 Aug. 26, 2004

(30) Foreign Application Priority Data

Feb. 19, 2003 (JP) .................................. 2003-040686

(51) Int. Cl.$^7$ .............................................. G02B 26/08
(52) U.S. Cl. .................... 359/207; 359/205; 359/216
(58) Field of Search ........................ 359/205–207, 359/216–219, 662, 708, 716–717; 347/244, 258–259

(56) References Cited

U.S. PATENT DOCUMENTS

| 5,646,767 A | 7/1997 | Iima et al. |
| 6,717,705 B2 * | 4/2004 | Takakubo .................... 359/207 |
| 2003/0146376 A1 | 8/2003 | Koreeda |

FOREIGN PATENT DOCUMENTS

| JP | 5-346553 | 12/1993 |
| JP | 7-287180 | 10/1995 |

* cited by examiner

*Primary Examiner*—James Phan
(74) *Attorney, Agent, or Firm*—Greenblum & Bernstein, P.L.C.

(57) ABSTRACT

There is provided a scanning optical system which includes an imaging optical system having a first plastic lens and a second plastic lens. With regard to an auxiliary scanning direction, the first plastic lens is configured such that origin points of surfaces thereof are located on opposite sides of a principal axis, an amount of shifting of each of the origin points of the surfaces with respect to the principal axis is less than half of a diameter of mirror-finished area of corresponding one of the surfaces thereof, and both of centers of curvature of the surfaces thereof on the respective origin points are positioned on the light source side of the first plastic lens. The second plastic lens is configured such that at least one of surfaces thereof has an anamorphic aspherical surface, at least one of origin points of the surfaces thereof being located on the same side of the principal axis as the origin point of a rear surface of the first plastic lens in the auxiliary scanning direction, an amount of shifting of each of the origin points thereof with respect to the principal axis being less than half of a diameter of mirror-finished area of corresponding one of the surfaces thereof in the auxiliary scanning direction.

8 Claims, 10 Drawing Sheets

SCANNING OPTICAL SYSTEM

BACKGROUND OF THE INVENTION

The present invention relates to a scanning optical system for forming a beam spot scanning on a scan target surface such as a surface of a photoconductive drum.

As is well known, scanning optical systems are installed in a variety of printing devices such as laser beam printers, a photo plotter, fax machines and copy machines. The scanning optical system dynamically deflects a laser beam (which has been on-off modulated according to image information) by use of a deflecting system such as a rotating polygon mirror, and converges the dynamically deflected laser beam on the scan target surface by use of an imaging optical system, by which the scan target surface is scanned with a spot beam. With this structure, an electrostatic latent image composed of a plurality of dots is drawn on the scan target surface.

In the following description, a direction in which the beam spot moves (i.e., a direction in which a scan line extends) will be referred to as a main scanning direction. A direction in which the scan target surface moves with respect to the scan line, I.e., a direction of rotation of the photoconductive drum will be referred to as an auxiliary scanning direction. Further, shapes of optical elements, directions of powers of the optical elements and the like are described with reference to the main and auxiliary scanning directions on the surface to be scanned. That is, if an optical element is described to have a refractive power in the main scanning direction, the power affects the beam in the main scanning direction on the scan target surface regardless of the orientation of the element.

In order to reduce manufacturing cost of the scanning optical system, plastic lenses are frequently used in the imaging optical system of the scanning optical system. In general, such a plastic lens provided in the scanning optical system is not covered with an antireflective coating because cost for covering the plastic lens with the antireflective coating is typically higher than cost for covering a glass lens with the antireflective coating.

When the plastic lens without the antireflective coating is used in the scanning optical system, a problem that undesired reflections are caused and a portion of the undesired reflections-reaches the scan target surface as a ghost light beam may arise.

Each of Japanese Patent Provisional Publications No. HEI 05-346553 and No. HEI 07-287180 discloses a scanning optical system configured to prevent the ghost light beam from reaching the scan target surface. In the scanning optical system disclosed in the publications, an optical axis of at least one lens of an imaging optical system is tilted and/or shifted with respect to an optical axis of another lens of the imaging optical system.

To downsize the scanning optical system, it is required that space between lenses in the imaging optical system of the scanning optical system is narrow. In order to remove the ghost light beam when the space between the lenses in the optical system is narrow, the amount of tilting and the amount of shifting of the lens in the imaging optical system is required to be relatively large.

In general, such a lens of the imaging optical system is configured to have a frame (having, for example, a prismatic form or a cylindrical form) surrounding a fringe portion of the lens for mounting on a housing of the scanning optical system. When it is required that the lens surface is tilted or shifted with respect to the optical axis of another lens for elimination of the ghost light beam, the lens is required to have a configuration in which optical surface reference axes of both lens surfaces of the lens are tilted or shifted with respect to a center axis of the frame of the lens due to a requirement concerning assembly of the scanning optical system. The term "optical surface reference axis" means an axis passing through an origin point that is set when a shape of a lens surface is described in a mathematical expression. Therefore, when the lens surface is a rotationally symmetrical surface, the optical surface reference axis is equal to a rotational axis of the lens surface.

Meanwhile, in the development stage of a mold of a plastic lens, the following processes are required to massproduce plastic lenses having high accuracy. Firstly, accuracy of a shape of a lens surface of the plastic lens molded by an initial mold is evaluated by comparing the shape of the lens surface with its theoretical shape. In this stage, it is required to find out an origin point (i.e., an intersection of the lens surface and its optical surface reference axis) of the lens surface molded by the initial mold.

Secondly, based on a result of the evaluation of accuracy of the shape of the lens surface, the initial mold is subjected to an additional cutting process to enhance accuracy thereof. By repeating the evaluation process and the additional cutting process, a mold for mass-production of the plastic lens having high accuracy can be achieved.

Although the above mentioned additional cutting process is necessary to enhance the accuracy of the mold, there is a case where the origin point of the lens surface shifts in the auxiliary scanning direction by the additional cutting process of the mold. For this reason, a considerably sophisticated technique is required to develop the mold of the plastic lens, which also increases manufacturing cost of the plastic lens.

In a case where the amounts of shifting of the optical surface reference axes of both lens surfaces of the plastic lens with respect to the center axis of the frame of the plastic lens are larger than half of a width of a mirror-finished surface area of the plastic lens in the auxiliary scanning direction, an additional problem that the origin points of the lens surfaces can not be found out occurs. When the origin point of the lens surface can not be found out, a special technique is required to evaluate the lens surfaces, which also increases manufacturing cost of the plastic lens.

SUMMARY OF THE INVENTION

The present invention is advantageous in that it provides a scanning optical system which enables to sufficiently remove ghost light beams without increasing an amount of tilting and an amount of shifting of a lens surface of a lens provided in an imaging optical system thereof.

According to an aspect of the invention, there is provided a scanning optical system for emitting a laser beam scanning in a main scanning direction on a scan target surface. The scanning optical system includes a light source that emits the laser beam, a deflector that dynamically deflects the laser beam emitted by the light source within a predetermined scanning range, and an imaging optical system that converges the deflected laser beam on the scan target surface to form a beam spot scanning in the main scanning direction.

In this structure, the imaging optical system includes a first plastic lens having a front surface located on a light source side and a rear surface located on a scan target surface side, the first plastic lens being configured such that origin points of the front and rear surfaces of the first plastic lens are located on opposite sides of a principal axis with regard to an auxiliary scanning direction which is perpendicular to the main scanning direction, an amount of shifting of each of the origin points of the first plastic lens with respect to the principal axis is less than half of a diameter of mirror-finished area of corresponding one of the front and rear surfaces of the first plastic lens, and both of centers of curvature of the front and rear surfaces of the first plastic lens on the respective origin points are positioned on the light source side of the first plastic lens.

The imaging optical system further includes a second plastic lens having a front surface located on the light source side and a rear surface located on the scan target surface side, at least one of the front and rear surfaces of the second plastic lens having an anamorphic aspherical surface, at least one of origin points of the front and rear surfaces of the second plastic lens being located on the same side of the principal axis as the origin point of the rear surface of the first plastic lens in the auxiliary scanning direction, an amount of shifting of each of the origin points of the second plastic lens with respect to the principal axis being less than half of a diameter of mirror-finished area of corresponding one of the front and rear surfaces of the second plastic lens in the auxiliary scanning direction. The second plastic lens is located on the scan target surface side with respect to the first plastic lens. The principal axis corresponds to an extension of a center axis of the laser beam lying between the deflector and the imaging optical system when the center axis is viewed along a line perpendicular to the auxiliary scanning direction.

With this configuration, the laser beam can be refracted by a large amount by the first plastic lens in the auxiliary scanning direction in a situation where both origin points of the first plastic lens are positioned within mirror-finished areas of the respective surfaces of the first plastic lens. Therefore, there is no possibility that the origin points of the lens surfaces of the first plastic lens are difficult to be found out.

Further, since the laser beam passed through the first plastic lens is refracted by a large amount in the auxiliary scanning direction, there is no necessity to tilt the anamorphic aspherical surfaces by a large amount. Therefore, there is almost no possibility that the origin point of the anamorphic aspherical surface shifts in the auxiliary scanning direction during the additional cutting process. Therefore, manufacturing cost of the scanning optical system can be kept at a low level.

Further, according to the above mentioned configurations, ghost light beams can be effectively removed even if spacing between lenses in the imaging optical system is narrow and the plastic lenses are not covered with antireflective coatings.

Optionally, with regard to the auxiliary scanning direction, the first plastic lens may be configured such that a distance from the origin point of the rear surface to the principal axis is larger than a distance from an intersection of the rear surface and the laser beam passing through the first plastic lens to the principal axis.

Still optionally, the second plastic lens may satisfy a condition:

$$Ha-1 \text{ [m]} < Za \text{ [mm]} < Ha+1 \quad (1)$$

where Za [mm] represents a distance in the auxiliary scanning direction from the principal axis to a center of curvature of one of the front and rear surfaces of the second plastic lens configured to be the anamorphic aspherical surface on its origin point, and Ha represents a distance in the auxiliary scanning direction from the principal axis to a point at which a central axis of the laser beam passing through the second plastic lens interests with the anamorphic aspherical surface.

Still optionally, the imaging optical system may satisfy a condition:

$$u'/u < 1 \quad (2)$$

where u represents an angle formed in the auxiliary scanning direction between the principal axis and a central axis of the laser beam being incident on the second plastic lens, u' represents an angle formed in the auxiliary scanning direction between the principal axis and a central axis of the laser beam emerging from the second plastic lens.

Still optionally, the amounts of shifting of the origin points of the front and rear surfaces of the second plastic lens with respect to the principal axis may be different from each other.

Still optionally, the imaging optical system may satisfy a condition:

$$-1.3 < m < -0.6 \quad (3)$$

where m represents a lateral magnification of the imaging optical system in the auxiliary scanning direction.

Still optionally, the imaging optical system may include at least one glass lens located between the first plastic lens and the second plastic lens, and the imaging optical system may satisfy a condition;

$$d1 \leq d0 \times 0.1 \quad (4)$$

where d0 represents a distance between the first plastic lens and the second plastic lens, and d1 represents a distance between the first plastic lens and the at least one glass lens.

In a particular case, the at least one glass lens may include a plurality of glass lenses. In this case, the distance d1 represents a distance between the first plastic lens and one of the plurality of glass lenses located nearest to the scan target surface.

BRIEF DESCRIPTION OF THE ACCOMPANYING DRAWINGS

DETAILED DESCRIPTION OF THE EMBODIMENTS

Hereinafter, an embodiment according to the invention is described with reference to the accompanying drawings.

Figure 1:
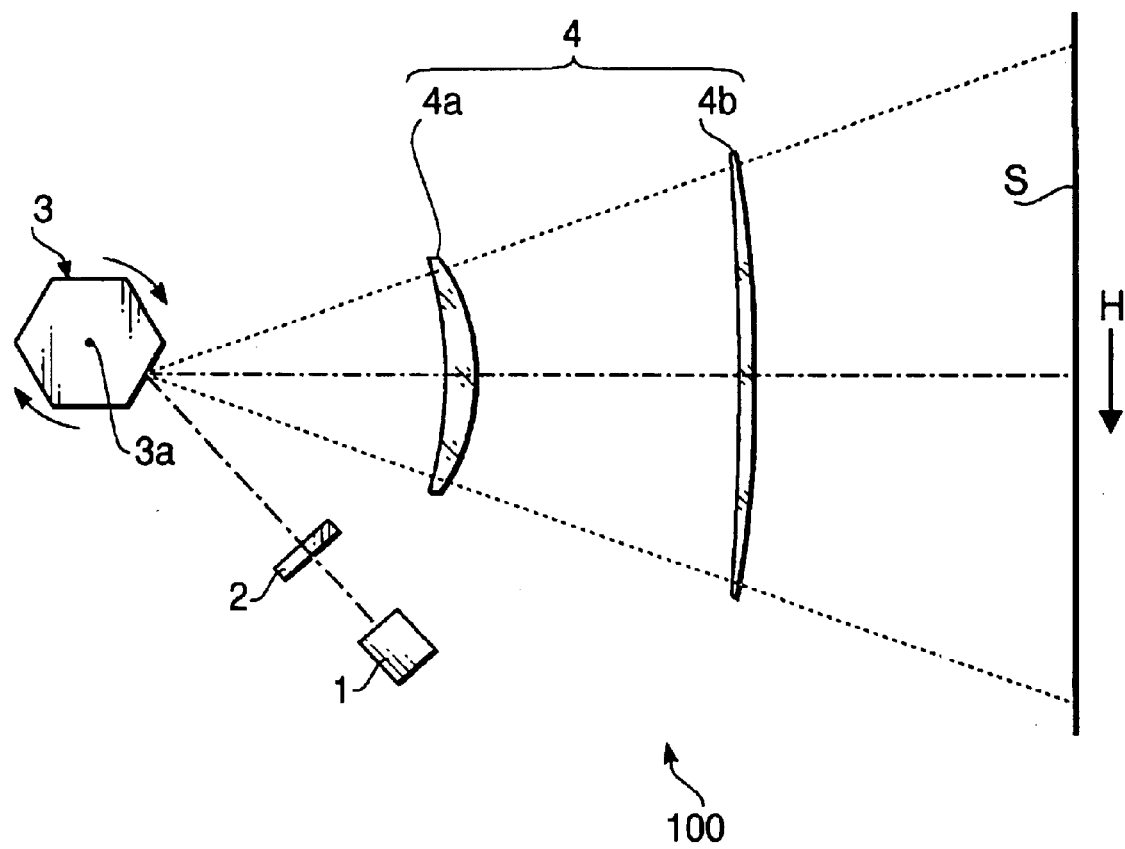
FIG. 1 shows an optical block diagram of a scanning optical system according to an embodiment of the invention viewed along a line parallel with an auxiliary scanning direction.

FIG. 1 shows an optical block diagram of a scanning optical system 100 according to an embodiment of the invention viewed along a line parallel with a rotational axis 3a of a polygonal mirror 3. The scanning optical system 100 includes a light source 1, a cylindrical lens 2, the polygonal mirror 3, and a scanning lens 4. The light source 1 has a semiconductor laser emitting a diverging beam and a collimator lens which collimates the diverging beam.

The cylindrical lens 2 converges the collimated beam emerging from the light source 1 only in the auxiliary scanning direction to form a line-like image extending in the main scanning direction in the vicinity of a reflective surface of the polygonal mirror 3. The polygonal mirror 3 has a flat prismatic form. As shown in FIG. 1, the polygonal mirror 3 has a top (bottom) surface having a form of a regular polygon, and has a plurality of side surfaces configured as reflective surfaces. Since the polygonal mirror 3 is rotated at a constant speed about its rotational axis 3a, a beam reflected by the polygonal mirror 3 scans in the main scanning direction.

The scanning lens 4, which functions as an imaging optical system, converges the deflected beam to form a beam spot scanning in the main scanning direction (i.e., in a direction of an arrow H in FIG. 1) on a scan target surface S. As described later, the scanning lens 4 includes a first and second plastic lenses 4a and 4b, and is configured to be an anamorphic optical system having a function of compensating for a scanning speed of the beam spot so that the scanning speed of the beam spot on the scan target surface becomes constant.

Since the scan target surface S which is, for example, a photoconductive drum, is moved in the auxiliary scanning direction, scan lines are repeatedly formed on the scan target surface S. Further, the beam is on-off modulated by a modulator (not shown) according to image data, a two-dimensional image composed of a plurality of dots can be formed on the scan target surface S.

With regard to the main scanning direction, the beam emitted by the light source 1 is deflected by the polygonal mirror 3 and proceeds to the scanning lens 4 with maintaining its parallelism, and then converged by the scanning lens 4 on the scan target surface S. With regard to the auxiliary scanning direction, the beam emitted by the light source 1 is converged by the cylindrical lens 2 in the vicinity of the reflective surface of the polygonal mirror 3, proceeds toward the scanning lens 4 as the diverging beam, and then is converged by the scanning lens 4 on the scan target surface S.

Since the scanning lens 4 sets the scan target surface S almost conjugate, in regard to the auxiliary scanning direction, with the vicinity of the reflective surface of the polygon mirror 3, the laser beam which formed the line-like image in the vicinity of the reflective surface is focused again at a position having a certain height on the scan target surface S regardless of the presence/absence of a so-called "facet error" (i.e., a slight tilting of each reflective surface of the polygonal mirror). Consequently, a plurality of scan lines are drawn with the same pitch (interval) on the scan target surface S regardless of which reflective surface of the polygon mirror 3 reflects the laser beam.

Figure 2:
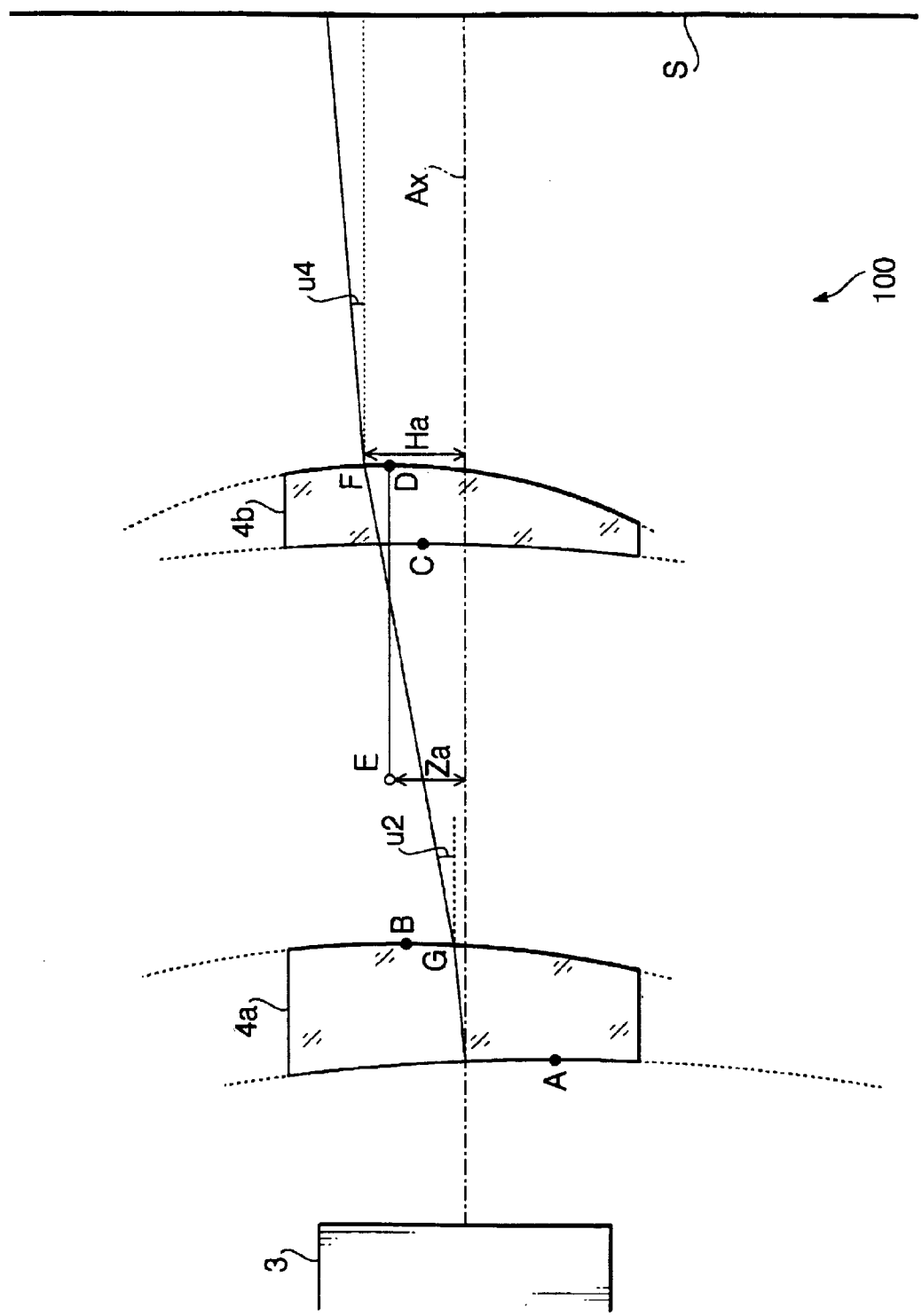
FIG. 2 shows a detailed optical configuration of a polygonal mirror, a scanning lens and a scan target surface of the scanning optical system viewed along a line perpendicular to the auxiliary scanning direction.

FIG. 2 shows a detailed optical configuration of the polygonal mirror 3, the scanning lens 4 and the scan target surface S of the scanning optical system 100 viewed along a line perpendicular to the auxiliary scanning direction. As described in detail later, some lens surfaces of scanning lens 4 are configured to be rotationally asymmetrical surfaces. Since such a rotationally asymmetrical surface does not have a symmetrical axis corresponding to an optical axis, the optical surface reference axis is regarded as an optical axis for the rotationally asymmetrical surface.

In FIG. 2, a principal axis Ax is indicated by a chain line. The principal axis Ax corresponds to an extension of a central axis of the beam between the polygonal mirror 3 and the first plastic lens 4a when the beam is reflected by an ideal reflective surface (i.e., a reflective surface without the facet error) and is incident on the scan target surface S at a center position of the scan line.

In FIG. 2, an origin point (i.e., an intersection of a rotationally asymmetrical surface and its optical surface reference axis) of each lens surface of the scanning lens 4 is indicated by a dot. That is, a front surface (a polygonal mirror side) and a rear surface (a scan target surface side) of the first plastic lens 4a have origin points A and B, respectively. Also, a front surface (a polygonal mirror side) and a rear surface (a scan target surface side) of the second plastic lens 4b have origin points C and D, respectively.

Hereafter, con figurations of the first and second rectangular form of the first and second plastic lenses 4a and 4b coincides with the principal axis Ax.

When the scanning lens 4 is viewed along a line parallel with the auxiliary scanning direction, each of origin points A,B,C and D of lens surfaces of the first and second plastic lenses 4a and 4b lies on the principal axis Ax.

As shown in FIG. 2, when the scanning lens 4 is viewed along a line perpendicular to the auxiliary scanning direction, the origin point A of the front surface of the scanning lens 4a lies on the lower side (in FIG. 2) with respect to the principal axis Ax and the origin point B of the rear surface of the first plastic lens 4a lies on the upper side with respect to the principal axis Ax. That is, the first plastic lens 4a is configured such that the origin points (A and B) of both of the front and rear surfaces thereof are located on opposite sides of the principal axis Ax, and that the origin points (A and B) are respectively located within mirror-finished surface areas of the front and rear surfaces of the first plastic lens.

Further, as shown in FIG. 2, the second plastic lens 4b is configured such that at least one of the origin points C and D is located on the upper side of the principal axis Ax. That is, at least one of origin points C and D is located on the same side of the principal axis Ax as the origin point B of the rear surface of the first plastic lens 4a in the auxiliary scanning direction. Further, the origin points (C and D) are located within mirror-finished surface areas of the front and rear surfaces of the second plastic lens 4b, respectively.

As shown in FIG. 2, the front surface of the first plastic lens 4a is a concave surface, and the rear surface of the plastic lens 4a is a convex surface. Both of the optical surface reference axes of the front and rear surfaces of the first plastic lens 4a are parallel with the principal axis Ax.

At least one of the front and rear surfaces of the second plastic lens 4b is an anamorphic aspherical surface. The optical surface reference axis of the anamorphic aspherical surface of the second plastic lens 4b may be parallel with the principal axis Ax. Alternatively, the optical surface reference axis of the anamorphic aspherical surface of the second plastic lens 4b may be tilted with respect to the principal axis Ax in the auxiliary scanning direction. When the second plastic lens 4b has a surface which is not an anamorphic aspherical surface, an optical reference axis of the surface which is not an anamorphic aspherical surface is parallel with the principal axis Ax.

The above mentioned configurations of the first and second plastic lenses provide the following advantages. Firstly, since the origin points A and B of the first plastic lens 4a are located on the opposite sides of the principal axis Ax, and are respectively located within the mirror-finished surfaces in the auxiliary scanning direction, the beam passing through the first plastic lens 4a can be refracted by a large amount in the auxiliary scanning direction even if the shift amount of the origin points are relatively small. Therefore, the origin point A or B of the plastic lens 4a can be easily found out during an evaluation process. Therefore, manufacturing cost of the scanning optical system 100 can be kept at a low level.

Secondly, since the beam is refracted by a large amount in the auxiliary scanning direction when it passes through the first plastic lens 4a, there is no necessity to tilt by a large amount the anamorphic aspherical surface of the second plastic lens 4b with respect to the principal axis Ax for elimination of the ghost light beam. Therefore, there is almost no possibility that the origin point of the lens surface (or a corresponding inner surface of a mold for the second plastic lens 4b) shifts in the auxiliary scanning direction during a manufacturing process (i.e., the additional cutting process) of the plastic lens 4b.

For this reason, the mold for the second plastic lens 4b can be developed by relatively low cost in comparison with a case where a mold for a lens whose optical surface reference axis is tilted by a relatively large amount with respect to a certain axis (e.g., an optical axis of another lens in an imaging optical system) is developed. Therefore, manufacturing cost of the scanning optical system 100 can be kept at a low level.

Consequently, ghost light beams can be moved away from a normal optical path even if spacing between optical components (such as the first and second plastic lenses 4a and 4b) shown in FIG. 2 is narrow and the first and second plastic lenses 4a and 4b are not covered with antireflective coatings.

To achieve more excellent scanning performance, the second plastic lens 4b is configured to satisfy a following condition:

$$Ha-1\ [mm] < Za\ [mm] < Ha+1\ [mm] \tag{1}$$

where, as shows in FIG. 2, Za [mm] represents a distance in the auxiliary scanning direction from the principal axis Ax to a center of curvature of a surface configured to be an anamorphic aspherical surface on an origin point of the anamorphic aspherical surface (i.e., a point E which is a center of curvature of the rear surface of the plastic lens 4b and which is indicated by a small hollow circle in FIG. 2), and Ha represents a distance in the auxiliary scanning direction from the principal axis Ax to a point at which a central axis of the beam passing through the second plastic lens 4b interests with the anamorphich aspherical surface (i.e., a point F in FIG. 2).

In addition to satisfying the condition (1), the second plastic lens. 4b may be configured to satisfy a condition:

$$u4/u2 < 1 \tag{2}$$

where, as shown in FIG. 2, u2 represents an angle formed in the auxiliary scanning direction between the principal axis Ax and a central axis of the beam being incident on the second plastic lens 4b, and u4 represents an angle formed in the auxiliary scanning direction between the principal axis Ax and a central axis of the beam emerging from the second plastic lens 4b.

If Za gets larger than the upper limit of the condition (1) or Za gets lower than the lower limit of the condition (1), aberrations caused by the anamorphic aspherical surface (i.e., the rear surface) of the second plastic lens 4b becomes great, and thereby it becomes difficult to correct the aberrations caused by the anamorphic aspherical surface. Further, if Za gets larger than the upper limit of the condition (1) or Za gets lower than the lower limit of the condition (1), the amount of tilting of the anamorphic aspherical surface with respect to the principal axis Ax is required to be a large amount, which raises a possibility that the origin point of the anamorphic aspherical surface is shifted by the additional cutting process during the manufacturing process of the mold of the second plastic lens 4b.

If the second plastic lens 4b does not satisfy the condition (2) (i.e., u4/u2≧1), the beam passed through the plastic lens 4b proceeds in a direction that increases a distance between the beam and the principal axis Ax. In this case, it becomes difficult to correct a coma or curvature of field caused by the first plastic lens 4a.

In addition to satisfying the conditions (1) and (2), the scanning lens 4 may be configured to satisfy a condition (3):

$$-1.3 < m < -0.6 \tag{3}$$

where m represents a lateral magnification of the scanning lens 4 in the auxiliary scanning direction. When the condition (3) is satisfied, the ghost light beams are effectively removed without tilting one of a lens in the scanning lens 4, by which processing and mounting of the lens of the scanning lens 4 becomes relatively easy.

If m gets larger than the upper limit of the condition (3) or m gets lower than the lower limit of the condition (3), it becomes difficult to remove the ghost light beams only by shifting a lens in the scanning lens 4.

The scanning optical system 100 is configured such that aberrations caused by the first plastic lens 4a are canceled by aberrations caused by the second plastic lens 4b. That is, the scanning optical system 100 is configured to effectively suppress a bow (i.e., a curve of the scan line) formed on the scan target surface and an increase of aberrations such as a coma. As a result, a reduction in resolution of an image formed on the scan target surface S particularly at end portions of the image is effectively prevented.

More specifically, in order that the aberrations caused by the first plastic lens 4a and the aberrations caused by the second plastic lens 4b cancel each other, the scanning optical system 100 is configured such that a distance between the origin point B of the rear surface of the first plastic lens 4a and the principal axis Ax is larger than a distance between a point G (i.e., an intersection of the rear surface of the first plastic lens 4a and the laser beam passing through the first plastic lens 4a) and the principal axis Ax, and that the condition (2) is satisfied.

When both of the aberration caused by the first plastic lens and the aberration caused by the second plastic lens 4b become too large, adequate scanning performance can not be achieved. For this reason, the amount of shifting of each origin point of the lens surfaces of the scanning lens 4 is required to be an appropriate amount.

More specifically, when the amount of shifting of the origin point A of the front surface of the first plastic lens 4a is set to a sufficiently low level, a bow caused on the scan target surface is more effectively suppressed. Further, when the amount of shifting of the origin point D of the anamorphic aspherical surface (the rear surface of the second plastic 4b in this embodiment) of the second plastic lens 4b satisfies the condition (1), the coma is more effectively suppressed.

Hereafter, four concrete examples according to the embodiment of the invention will be described.

FIRST EXAMPLE

Figure 3:
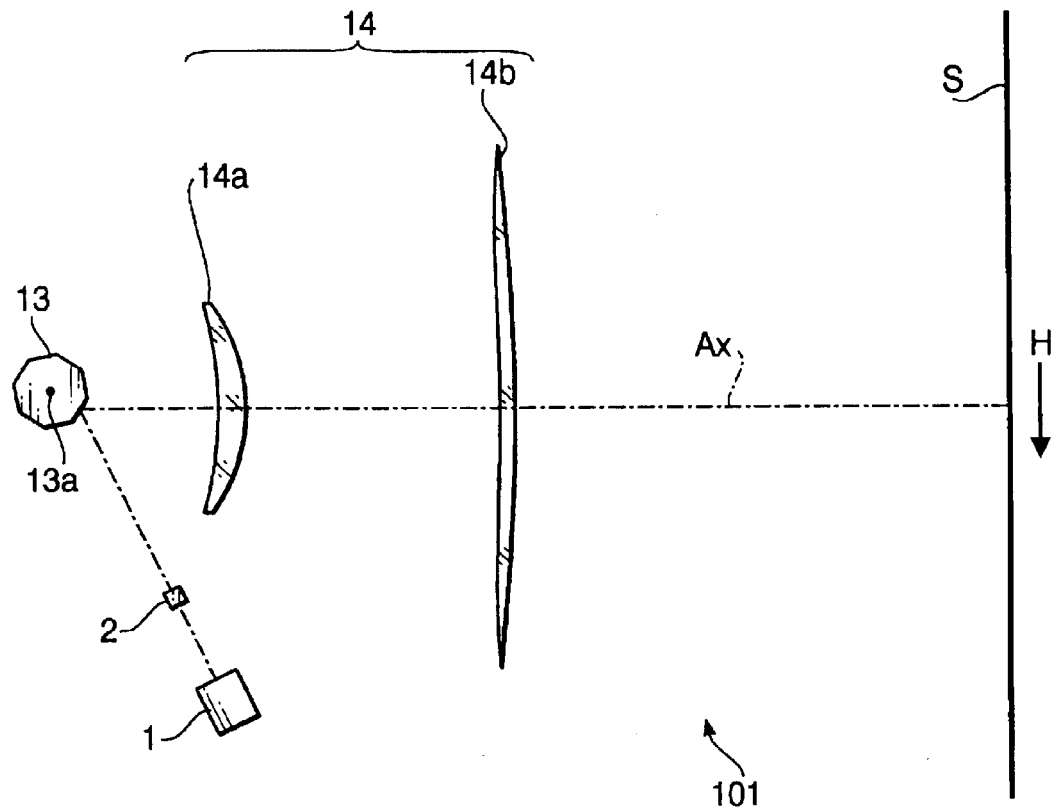
FIG. 3 shows an optical block diagram of a scanning optical system according to a first example of the embodiment of the invention viewed along a line parallel with the auxiliary scanning direction.
Figure 4:
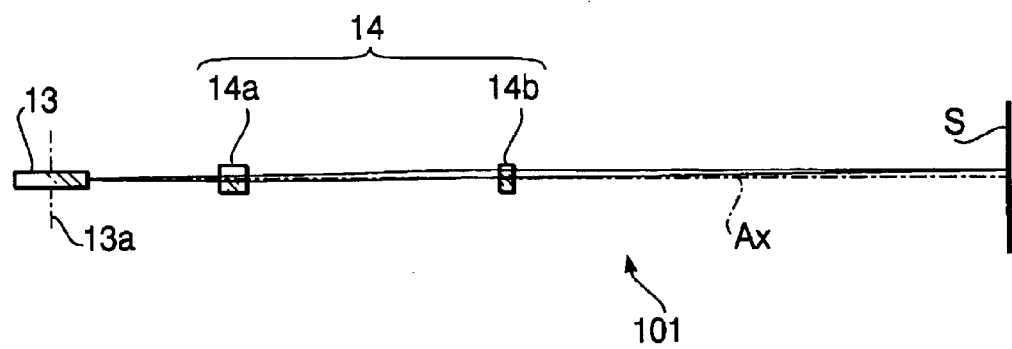
FIG. 4 shows an optical block diagram of a polygonal mirror, a scanning lens, and the scan target surface of the scanning optical system of the first example viewed along a line perpendicular to the auxiliary scanning direction.

FIG. 3 shows an optical block diagram of a scanning optical system 101 according to a first example of the embodiment of the invention viewed along a line parallel with the auxiliary scanning direction. FIG. 4 shows an optical block diagram of a polygonal mirror 13 having a rotational axis 13a, a scanning lens 14, and the scan target surface S of the scanning optical system 101 viewed along a line perpendicular to the auxiliary scanning direction. In FIGS. 3 and 4, to elements which are similar to those in FIG. 1, the same reference numbers are assigned, and the detailed description thereof will not be repeated.

TABLE 1 shows a concrete numerical configuration of the scanning optical system 101 from the cylindrical lens 2 through the scan target surface S.

TABLE 1

| No. | Ry | Rz | d | n | z |
|-----|------|------|------|------|------|
| #1 | ∞ | 33.200 | 4.000 | 1.51072 | 4 mm |
| #2 | ∞ | ∞ | 62.000 | | 4 mm |
| #3 | ∞ | ∞ | 36.000 | | 2 mm |
| #4 | −108.910 | −108.910 | 8.000 | 1.48617 | 7 mm |
| #5 | −52.082 | −52.082 | 77.000 | | 7 mm |

TABLE 1-continued

| No. | Ry | Rz | d | n | z |
|-----|------|------|------|------|------|
| #6 | −559.494 | 33.036 | 4.000 | 1.48617 | 7 mm |
| #7 | −665.457 | −665.457 | 123.930 | | 7 mm |

In TABLE 1, the character "No." indicates surface numbers that are assigned to optical surfaces in the scanning optical system 101 starting from a front surface (a beam incident surface) of the cylindrical lens 2. That is, #1 and #2 denote the front surface and a rear surface (a beam emerging surface) of the cylindrical lens 2, respectively. The #3 denotes the reflective surface of the polygonal mirror 13. The #4 and #5 denote a front surface (a polygonal mirror side) and a rear surface (a scan target surface side) of a first plastic lens 14a, respectively. The #6 and #7 denote a front surface and a rear surface of a second plastic lens 14b, respectively.

The character "Ry" denotes a radius of curvature [mm] of each optical surface on its optical surface reference axis measured in the main scanning direction, and "Rz" denotes a radius of curvature [mm] of each optical surface on its optical surface reference axis measured in the auxiliary scanning direction. The character "d" denotes the distance [mm] between an optical surface and a next optical surface measured along an optical surface reference axis, "n" denotes a refractive index of each lens at a design wavelength of 780 nm, and "z" denotes a size of a mirror-finished surface area of each element in the auxiliary scanning direction.

In Table 1 (and in the following equivalent tables), if a lens surface is tilted with respect to a certain point, numerical data of the lens surface indicates data when the lens surface is not tilted.

In the first example, the front surface (#4) and the rear surface (#5) of the first plastic lens 14a are formed to be a concave spherical surface and a convex rotationally symmetrical aspherical surface, respectively. The front surface (#6) and the rear surface (#7) of the second plastic lens 14b are formed to be an anamorphic aspherical surface and a convex rotationally symmetrical aspherical surface, respectively.

The rotationally symmetrical aspherical surface is expressed by a following equation:

$$X(h) = \frac{Ch^2}{1+\sqrt{1-(1+\kappa)C^2h^2}} + A_2h^2 + A_4h^4 + A_6h^6 + \ldots \quad (4)$$

where X(h) represents a SAG amount which is a distance between a point on the aspherical surface at a height of h from the optical axis and a plane tangential to the aspherical surface at the optical axis. K represents a conical coefficient, and $A_2$, $A_4$ and $A_6$ are aspherical coefficients of $2^{th}$, $4^{th}$ and $6^{th}$ orders, respectively. C is curvature of the rotationally symmetrical aspherical surface on its optical axis.

Aspherical coefficients of the rear surface (#5) of the first plastic lens 14a and the rear surface (#7) of the second plastic lens 14b are indicated in Table 2. The other aspherical coefficients which are not shown in Table 2 are all zero. The conical coefficient of each of the surfaces #5 and #7 is zero.

TABLE 2

|  | #5 | #7 |
|---|---|---|
| $A_4$ | $4.88072 \times 10^{-7}$ | $1.98405 \times 10^{-8}$ |

The anamorphic aspherical surface is defined by the following equations:

$$X(Y) = \frac{CY^2}{1 + \sqrt{1-(1+\kappa)C^2Y^2}} + AM_2Y^2 + AM_4Y^4 + AM_6Y^6 + \ldots \quad (5)$$

$$\frac{1}{Rz(Y)} = \frac{1}{Rz_0} + AS_1Y + AS_2Y^2 + AS_3Y^3 + \ldots \quad (6)$$

where X(Y) is a SAG amount which is obtained as a function of a coordinate Y extending in the main scanning direction. The SAG amount X(Y) represents a distance between a plane tangential to the anamorphic aspherical surface at the optical surface reference axis and a point on a curved line extending along the anamorphic aspherical surface in the main scanning direction and passing the optical surface reference axis thereof. C (=1/Ry) represents curvature of the anamorphic aspherical surface in the main scanning direction at the optical surface reference axis. Further, 1/Rz(Y) represents curvature of an arc extending in the auxiliary scanning direction, and the arc is intersecting the curved line at the point whose coordinate is Y. $Rz_0$ represents a radius of curvature (i.e., Rz in Table 1) of the surface on the optical surface reference axis thereof in the auxiliary scanning direction (i.e., a direction of z-axis). K represents a conical coefficient, and $AM_n$, is an aspherical coefficient of $n^{th}$ order for the main scanning direction. $AS_n$ is an aspherical coefficient of $n^{th}$ order for determining the curvature in the auxiliary scanning direction.

Values of coefficients of the front surface (#6) of the second plastic lens 14b are indicated in Table 3. The other coefficients which are not shown in Table 3 are all zero. The conical coefficient of the surface #6 is zero.

TABLE 3

| surface #6 | | | |
|---|---|---|---|
| $AM_1 =$ | 0 | $AS_1 =$ | $-6.40612 \times 10^{-7}$ |
| $AM_2 =$ | 0 | $AS_2 =$ | $-1.18244 \times 10^{-6}$ |
| $AM_4 =$ | $2.28400 \times 10^{-7}$ | $AS_4 =$ | $1.59207 \times 10^{-11}$ |
| $AM_6 =$ | $-1.76554 \times 10^{-11}$ | $AS_6 =$ | 0 |
| $AM_8 =$ | $7.84947 \times 10^{-16}$ | $AS_8 =$ | 0 |

Table 4 shows amounts of shifting of the origin points A–D of the surfaces #4–#7 of the first and second plastic lenses 14a and 14b with respect to the principal axis Ax. The amount of shifting has a positive sign when the origin point is shifted upward with respect to the principal axis Ax on FIG. 2, and has a negative sign when the origin point is shifted downward with respect to the principal axis Ax on FIG. 2.

TABLE 4

| SURFACE | AMOUNT OF SHITING OF ORIGIN POINT |
|---|---|
| #4 | −1.8 mm |
| #5 | +0.8 mm |

TABLE 4-continued

| SURFACE | AMOUNT OF SHITING OF ORIGIN POINT |
|---|---|
| #6 | +0.6 mm |
| #7 | +0.3 mm |

In this example, Za [mm] (which is a distance between the center of curvature E of the anamorphic aspherical surface #6 of the second plastic lens 14b and the principal axis Ax in the auxiliary scanning direction) takes a value of 0.60 mm. Ha [mm] (which is a distance between a point at which a central axis of the beam passing through the second plastic lens 14b interests with the anamorphich aspherical surface #6 and the principal axis Ax in the auxiliary scanning direction) takes a value of 1.20 mm. Since in this case 0.20 mm<0.60 mm<+2.20 mm holds, the scanning optical system 101 of the first example satisfies the condition (1).

With regard to values of u2 and u4 that relate to the refraction of the beam in the auxiliary scanning direction, u2 (which is an angle formed between a central axis of the beam being incident on the second plastic lens 14b and the principal axis Ax in the auxiliary scanning direction) takes a value of 0.87°, and u4 (which is an angle formed between a central axis of the beam emerging from the second plastic lens 14b and the principal axis Ax in the auxiliary scanning direction) takes a value of 0.43°. Since in this case u4/u2= 0.494, the scanning optical system 101 of the first example satisfies the condition (2).

In this example, the polygonal mirror 13 has a form of a flat prism and has a bottom (top) surface having a regular octagonal form whose diameter of a circumscribed circle circumscribing the bottom surface thereof is 40 mm. The polygonal mirror 3 has a thickness of 4 mm in the auxiliary scanning direction. A focal length of the scanning lens 14 is 200 mm, and a scanning width on the scan target surface S is 216 mm.

The lateral magnification m of the scanning lens 14 in the auxiliary scanning direction is −1.2534. In this case, −1.3<− 1.2534<−0.6 holds. Accordingly, the scanning optical system 101 of the first example satisfies the condition (3).

Figure 5:
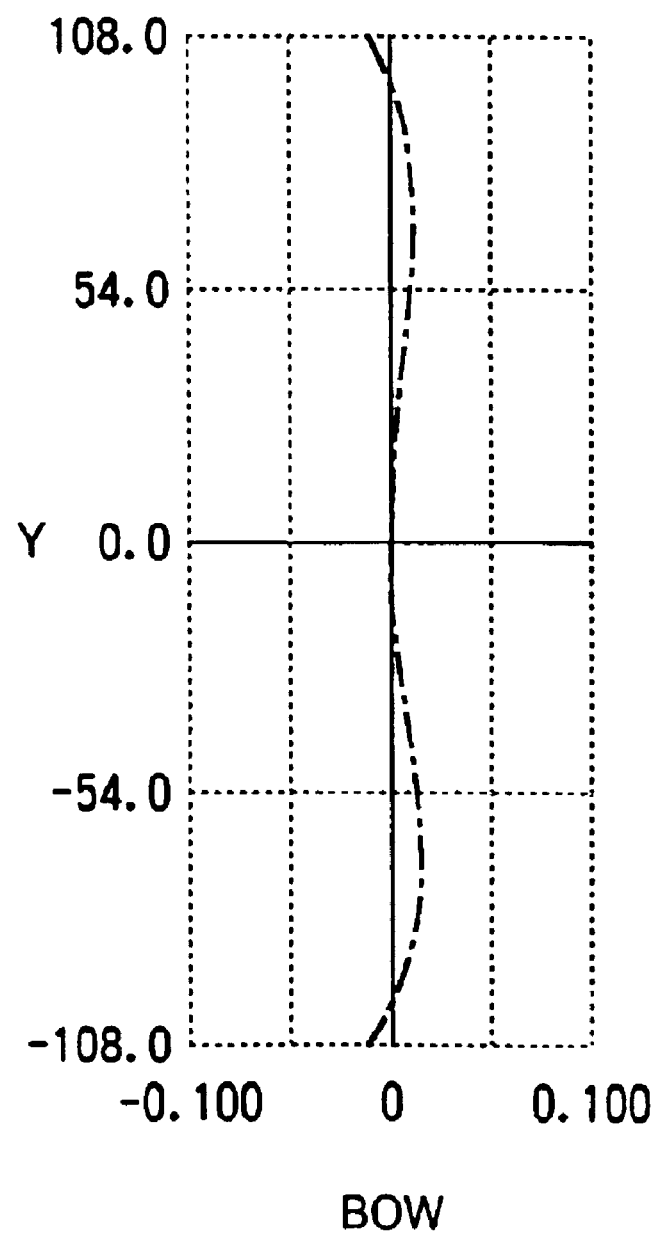
FIG. 5 is a graph illustrating a bow as optical performance of the scanning optical system of the first example.

FIG. 5 is a graph illustrating a bow (i.e., the curve of the scan line) as optical performance of the scanning optical system 101 of the first example. In FIG. 5 (and in FIGS. 8, 11 and 14), a vertical axis represents a position Y in the main scanning direction (unit:mm), and a horizontal axis represents an amount of aberration (unit:mm). As can be seen from FIG. 5, the bow is sufficiently suppressed in the scanning optical system 101 of the first example.

SECOND EXAMPLE

Figure 6:
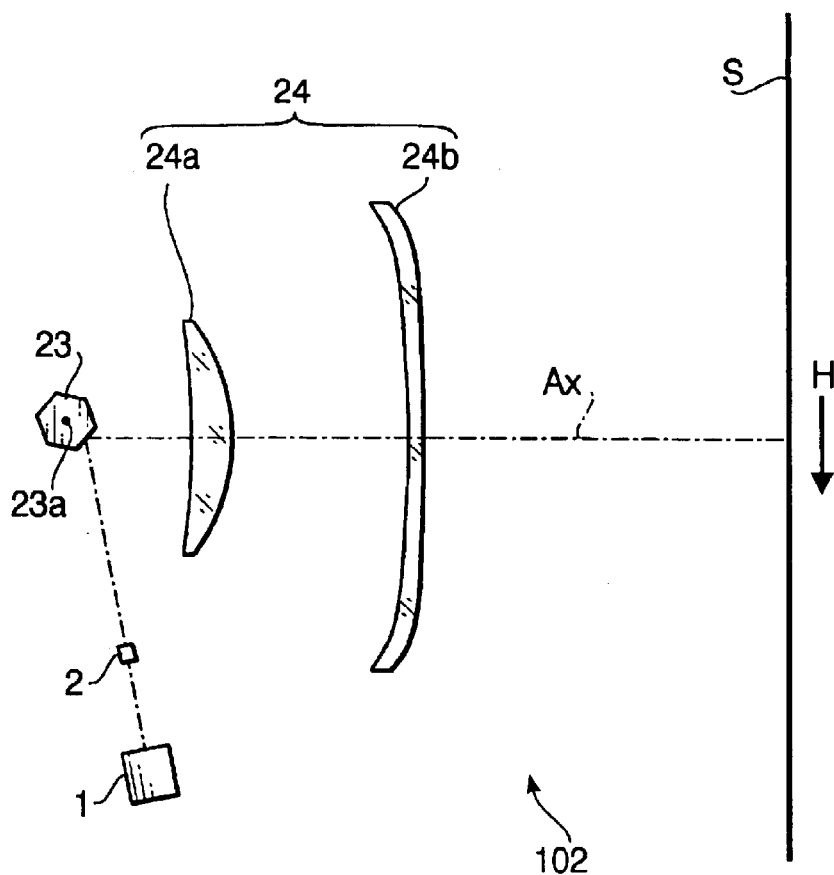
FIG. 6 shows an optical block diagram of a scanning optical system according to a second example of the embodiment of the invention viewed along a line parallel with the auxiliary scanning direction.
Figure 7:
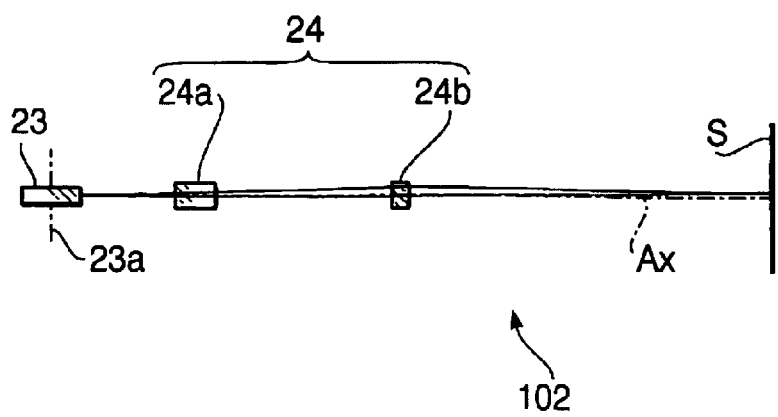
FIG. 7 shows an optical block diagram of a polygonal mirror, a scanning lens and the scan target surface S of the scanning optical system of the second example viewed along a line perpendicular to the auxiliary scanning direction.

FIG. 6 shows an optical block diagram of a scanning optical system 102 according to a second example of the embodiment of the invention viewed along a line parallel with the auxiliary scanning direction. FIG. 7 shows an optical block diagram of a polygonal mirror 23 having a rotational axis 23a, a scanning lens 24 and the scan target surface S of the scanning optical system 102 viewed along a line perpendicular to the auxiliary scanning direction. In FIGS. 6 and 7, to elements which are similar to those in FIG. 1, the same reference numbers are assigned, and the detailed description thereof will not be repeated.

TABLE 5 shows a concrete numerical configuration of the scanning optical system 102 from the cylindrical lens 2 through the scan target surface S.

TABLE 5

| No. | Ry | Rz | d | n | z |
|---|---|---|---|---|---|
| #1 | ∞ | 33.200 | 4.000 | 1.51072 | 4 mm |
| #2 | ∞ | ∞ | 62.000 | | 4 mm |
| #3 | ∞ | ∞ | 27.000 | | 2 mm |
| #4 | −230.722 | −230.722 | 12.000 | 1.51921 | 7 mm |
| #5 | −52.292 | −52.292 | 50.000 | | 7 mm |
| #6 | −172.538 | −172.538 | 4.000 | 1.48617 | 7 mm |
| #7 | −368.504 | −20.550 | 88.244 | | 7 mm |

Symbols shown in Table 5 have the same meanings as those of Table 1. In the second example, a front surface (#4) and a rear surface (#5) of a first plastic lens 24a are formed to be a concave spherical surface and a convex rotationally symmetrical aspherical surface, respectively. A front surface (#6) and a rear surface (#7) of a second plastic lens 24b are formed to be a convex rotationally symmetrical aspherical surface and an anamorphic aspherical surface, respectively.

Aspherical coefficients of the rear surface (#5) of the first plastic lens 24a and the front surface (#6) of the second plastic lens 24b are indicated in Table 6. The other aspherical coefficients which are not shown in Table 6 are all zero. The conical coefficient of each of the surfaces #5 and #6 is zero.

TABLE 6

| | #5 | #6 |
|---|---|---|
| $A_4$ | $1.16410 \times 10^{-6}$ | $1.29114 \times 10^{-6}$ |
| $A_6$ | $-2.48856 \times 10^{-10}$ | $-2.49873 \times 10^{-10}$ |
| $A_8$ | $3.03089 \times 10^{-14}$ | 0 |

Values of coefficients of the rear surface (#7) of the second plastic lens 24b are indicated in Table 7. The other coefficients which are not shown in Table 7 are all zero. The conical coefficient of the surface #7 is zero.

TABLE 7 surface #7

| $AM_1 =$ | 0 | $AS_1 =$ | $5.77165 \times 10^{-6}$ |
|---|---|---|---|
| $AM_2 =$ | 0 | $AS_2 =$ | $8.02298 \times 10^{-6}$ |
| $AM_4 =$ | $5.70292 \times 10^{-7}$ | $AS_4 =$ | $-1.84442 \times 10^{-9}$ |
| $AM_6 =$ | $-8.55077 \times 10^{-11}$ | $AS_6 =$ | $1.81123 \times 10^{-13}$ |
| $AM_8 =$ | $-2.24545 \times 10^{-14}$ | $AS_8 =$ | $-6.00877 \times 10^{-17}$ |
| $AM_{10} =$ | $1.81613 \times 10^{-18}$ | $AS_8 =$ | 0 |
| $AM_{12} =$ | $1.21412 \times 10^{-22}$ | $AS_8 =$ | 0 |
| $AM_{14} =$ | $-3.18196 \times 10^{-26}$ | $AS_8 =$ | 0 |

Table 8 shows amounts of shifting of the origin points A–D of the surfaces #4–#7 of the first and second plastic lenses 24a and 24b with respect to the principal axis Ax. The amount of shifting has a positive sign when the origin point is shifted upward with respect to the principal axis Ax on FIG. 2, and has a negative sign when the origin point is shifted downward with respect to the principal axis Ax on FIG. 2.

TABLE 8

| SURFACE | AMOUNT OF SHITING OF ORIGIN POINT |
|---|---|
| #4 | −0.1 mm |
| #5 | +2.0 mm |

TABLE 8-continued

| SURFACE | AMOUNT OF SHITING OF ORIGIN POINT |
|---|---|
| #6 | +0.3 mm |
| #7 | +0.2 mm |

In this example, Za [mm] (which is a distance between the center of curvature E of the anamorphic aspherical surface #7 of the second plastic lens 24b and the principal axis Ax in the auxiliary scanning direction) takes a value of 0.20 mm. Ha [mm] (which is a distance between a point at which an central axis of the beam passing through the second plastic lens 24b interests with the anamorphich aspherical surface #7 and the principal axis Ax in the auxiliary scanning direction) takes a value of 1.07 mm. Since in this case 0.07 mm<0.20 mm<2.07 mm holds, the scanning optical system 102 of the second example satisfies the condition (1).

With regard to values of u2 and u4 that relate to the refraction of the beam in the auxiliary scanning direction, u2 (which is an angle formed between a central axis of the beam being incident on the second plastic lens 24b and the principal axis Ax in the auxiliary scanning direction) takes a value of 1.15°, and u4 (which is an angle formed between a central axis of the beam emerged from the second plastic lens 24b and the principal axis Ax in the auxiliary scanning direction) takes a value of 0.10°. Since in this case u4/u2= 0.087, the second example satisfies the condition (2).

In this example, the polygonal mirror 23 has a form of a flat prism and has a bottom (top) surface having a regular hexagonal form whose diameter of a circumscribed circle circumscribing the bottom surface is 30 mm. The polygonal mirror 23 has a thickness of 4 mm in the auxiliary scanning direction. A focal length of the scanning lens 24 is 145 mm, and a scanning width on the scan target surface S is 216 mm.

The lateral magnification m of the scanning lens 24 in the auxiliary scanning direction is −1.1997. In this case, −1.3<−1.1997<−0.6 holds. Accordingly, the scanning optical system 102 of the second example satisfies the condition (3).

Figure 8:
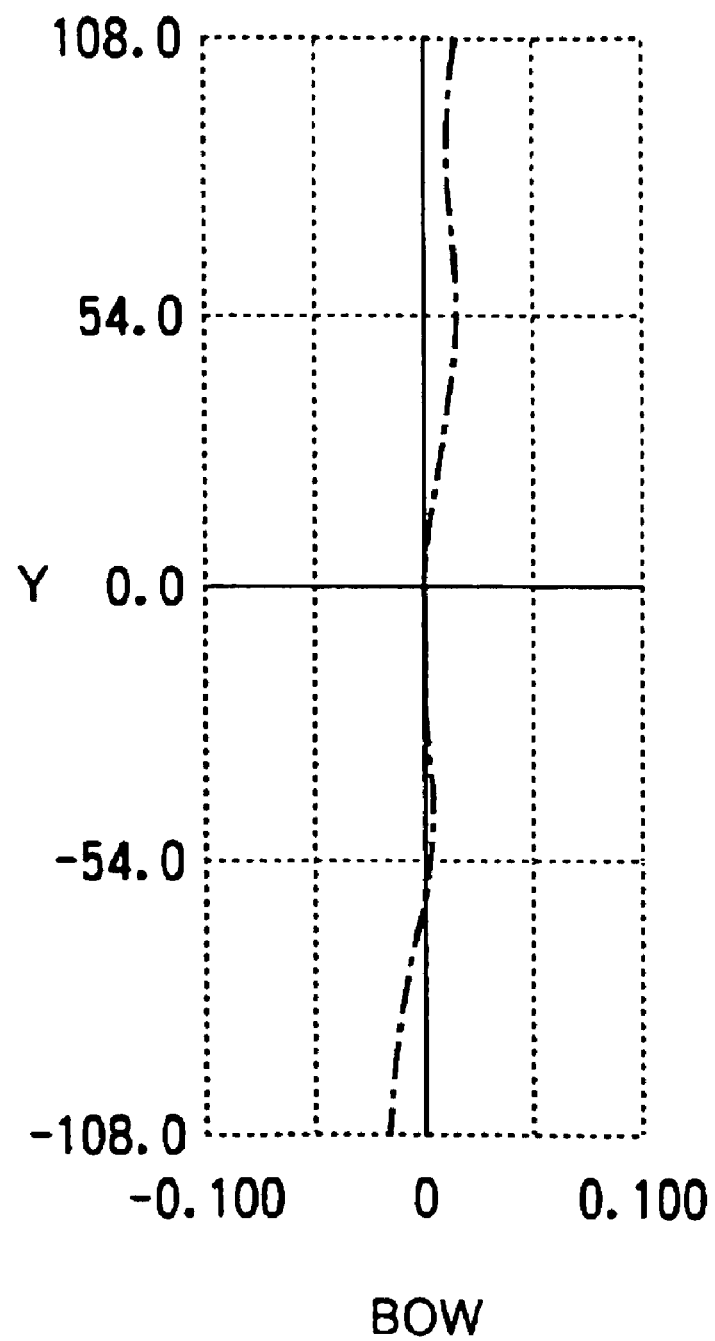
FIG. 8 is a graph illustrating a bow as optical performance of the second example.

FIG. 8 is a graph illustrating a bow (i.e., the curve of the scan line on the scan target surface S) as optical performance of the second example. As can be seen from FIG. 8, the bow is sufficiently suppressed in the scanning optical system 102 of the second example.

THIRD EXAMPLE

Figure 9:
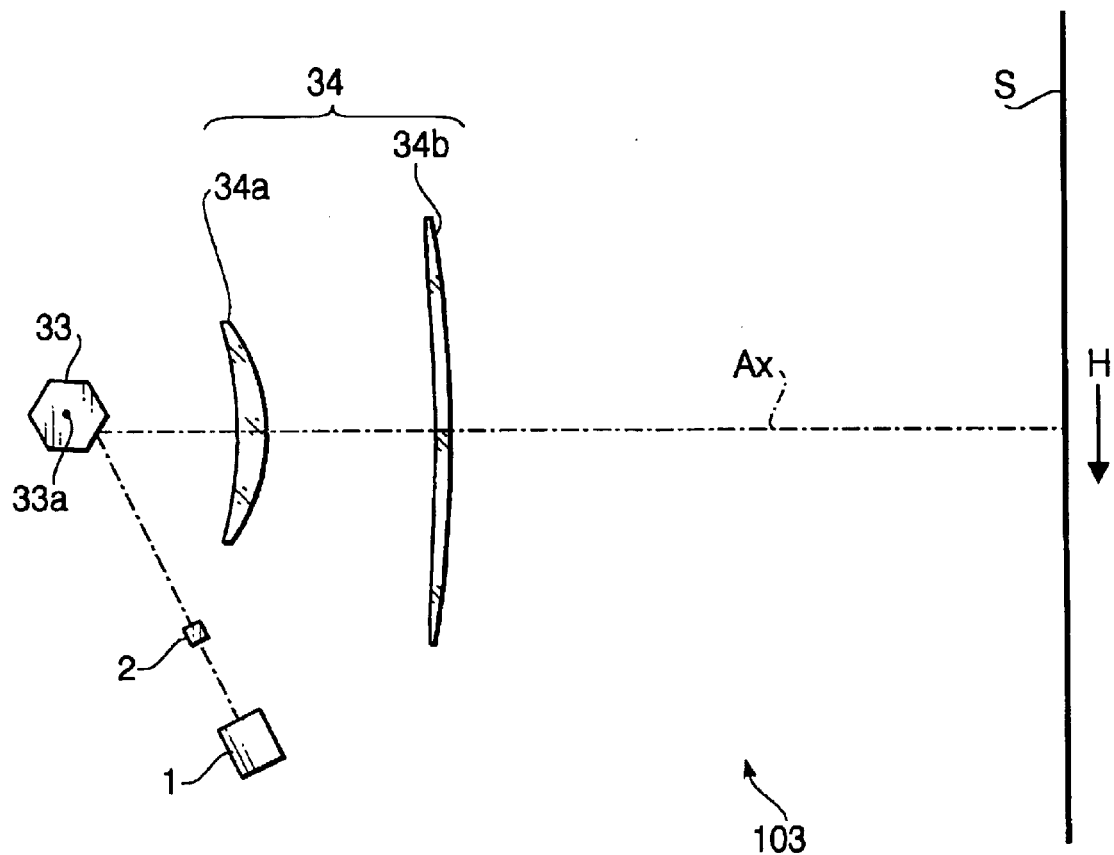
FIG. 9 shows an optical block diagram of a scanning optical system according to a third example of the embodiment of the invention viewed along a line parallel with the auxiliary scanning direction.
Figure 10:
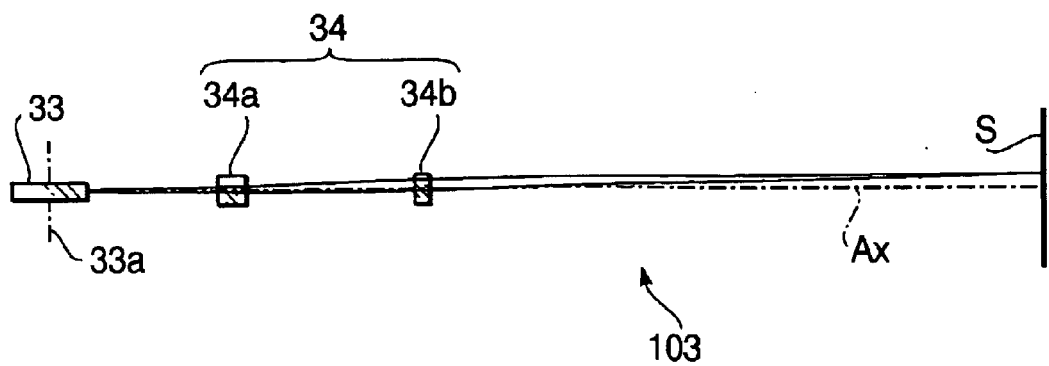
FIG. 10 shows an optical block diagram of a polygonal mirror, a scanning lens and the scan target surface of the scanning optical system of the third example viewed along a line perpendicular to the auxiliary scanning direction.

FIG. 9 shows an optical block diagram of a scanning optical system 103 according to a third example of the embodiment of the invention viewed along a line parallel with the auxiliary scanning direction. FIG. 10 shows an optical block diagram of a polygonal mirror 33 having a rotational axis of 33a, a scanning lens 34 and the scan target surface S of the scanning optical system 103 viewed along a line perpendicular to the auxiliary scanning direction. In FIGS. 9 and 10, to elements which are similar to those in FIG. 1, the same reference numbers are assigned, and the detailed description thereof will not be repeated.

TABLE 9 shows a concrete numerical configuration of the scanning optical system 103 from the cylindrical lens 2 through the scan target surface S.

TABLE 9

| No. | Ry | Rz | d | n | z |
|---|---|---|---|---|---|
| #1 | ∞ | 33.200 | 4.000 | 1.51072 | 4 mm |
| #2 | ∞ | ∞ | 62.000 | | 4 mm |
| #3 | ∞ | ∞ | 36.000 | | 2 mm |
| #4 | −110.000 | −110.000 | 8.000 | 1.48617 | 7 mm |
| #5 | −52.000 | −52.000 | 48.000 | | 7 mm |
| #6 | −388.881 | 33.660 | 4.000 | 1.48617 | 7 mm |
| #7 | −456.551 | −456.551 | 153.162 | | 7 mm |

Symbols shown in Table 9 have the same meanings as those of Table 1. In the third example, a front surface (#4) and a rear surface (#5) of a first plastic lens 34a are formed to be a concave spherical surface and a convex rotationally symmetrical aspherical surface, respectively. A front surface (#6) and a rear surface (#7) of a second plastic lens 34b are formed to be an anamorphic aspherical surface and a convex rotationally symmetrical aspherical surface, respectively.

Aspherical coefficients of the rear surface (#5) of the first plastic lens 34a and the rear surface (#7) of the second plastic lens 34b are indicated in Table 10. The other aspherical coefficients which are not shown in Table 10 are all zero. The conical coefficient of each of the surfaces #5 and #7 is zero.

TABLE 10

| | #5 | #7 |
|---|---|---|
| $A_4$ | $9.23017 \times 10^{-7}$ | $-9.23174 \times 10^{-8}$ |

Values of coefficients of the front surface (#6) of the second plastic lens 34b are indicated in Table 11. The other coefficients which are not shown in Table 11 are all zero. The conical coefficient of the surface #6 is zero.

TABLE 11

| surface #6 | | | |
|---|---|---|---|
| $AM_1 =$ | 0 | $AS_1 =$ | $-1.23514 \times 10^{-6}$ |
| $AM_2 =$ | 0 | $AS_2 =$ | $-2.10004 \times 10^{-6}$ |
| $AM_4 =$ | $3.44122 \times 10^{-7}$ | $AS_4 =$ | $3.73900 \times 10^{-11}$ |
| $AM_6 =$ | $-6.18097 \times 10^{-11}$ | $AS_6 =$ | 0 |
| $AM_8 =$ | $5.06095 \times 10^{-15}$ | $AS_8 =$ | 0 |

Table 12 shows amounts of shifting of the origin points A and B of the surfaces #4 and #5 of the first plastic lens 34a with respect to the principal axis Ax. The amount of shifting has a positive sign when the origin point is shifted upward with respect to the principal axis Ax on FIG. 2, and has a negative sign when the origin point is shifted downward with respect to the principal axis Ax on FIG. 2.

TABLE 12

| SURFACE | AMOUNT OF SHITING OF ORIGIN POINT |
|---|---|
| #4 | −2.4 mm |
| #5 | +1.0 mm |

Optical surface reference axes of the front and rear surfaces of the second plastic lens 34b coincide with each other, and are shifted by the same amount of +0.2 mm in the auxiliary scanning direction with respect to the principal axis Ax. Further, each of the front and rear surfaces of the second plastic lens 34b is tilted by 1.40 with respect to the origin point C of the front surface of the second plastic lens 34b counterclockwise on FIG. 10.

In this example, Za [mm] (which is a distance between the center of curvature E of the anamorphic aspherical surface #6 of the second plastic lens 34b and the principal axis Ax in the auxiliary scanning direction) takes a value of 1.09 mm. Ha [mm] (which is a distance between a point at which an central axis of the beam passing through the second plastic lens 34b interests with the anamorphich aspherical surface #6 and the principal axis Ax in the auxiliary scanning direction) takes a value of 1.06 mm. Since in this case 0.06 mm<1.09 mm<2.06 mm holds, the scanning optical system 103 of the third example satisfies the condition (1).

With regard to values of u2 and u4 that relate to the refraction of the beam in the auxiliary scanning direction, u2 (which is an angle formed between a central axis of the beam being incident on the second plastic lens 34b and the principal axis Ax in the auxiliary scanning direction) takes a value of 1.11°, and u4 (which is an angle formed between a central axis of the beam emerged from the second plastic lens 34b and the principal axis Ax in the auxiliary scanning direction) takes a value of 0.41°. Since in this case u4/u2= 0.369, the scanning optical system 103 of the third example satisfies the condition (2).

In this example, the polygonal mirror 33 has a form of a flat prism and has a bottom (top) surface having a regular hexagonal form whose diameter of a circumscribed circle circumscribing a bottom surface of the flat regular hexagonal prism is 40 mm. The polygonal mirror 33 has a thickness of 4 mm in the auxiliary scanning direction. A focal length of the scanning lens 34 is 200 mm, and a scanning width on the scan target surface S is 216 mm.

The lateral magnification m of the scanning lens 34 in the auxiliary scanning direction is −2.1878. In this case, −1.3<− 2.1878<−0.6 does not hold. Accordingly, the third example does not satisfy the condition (3).

Figure 11:
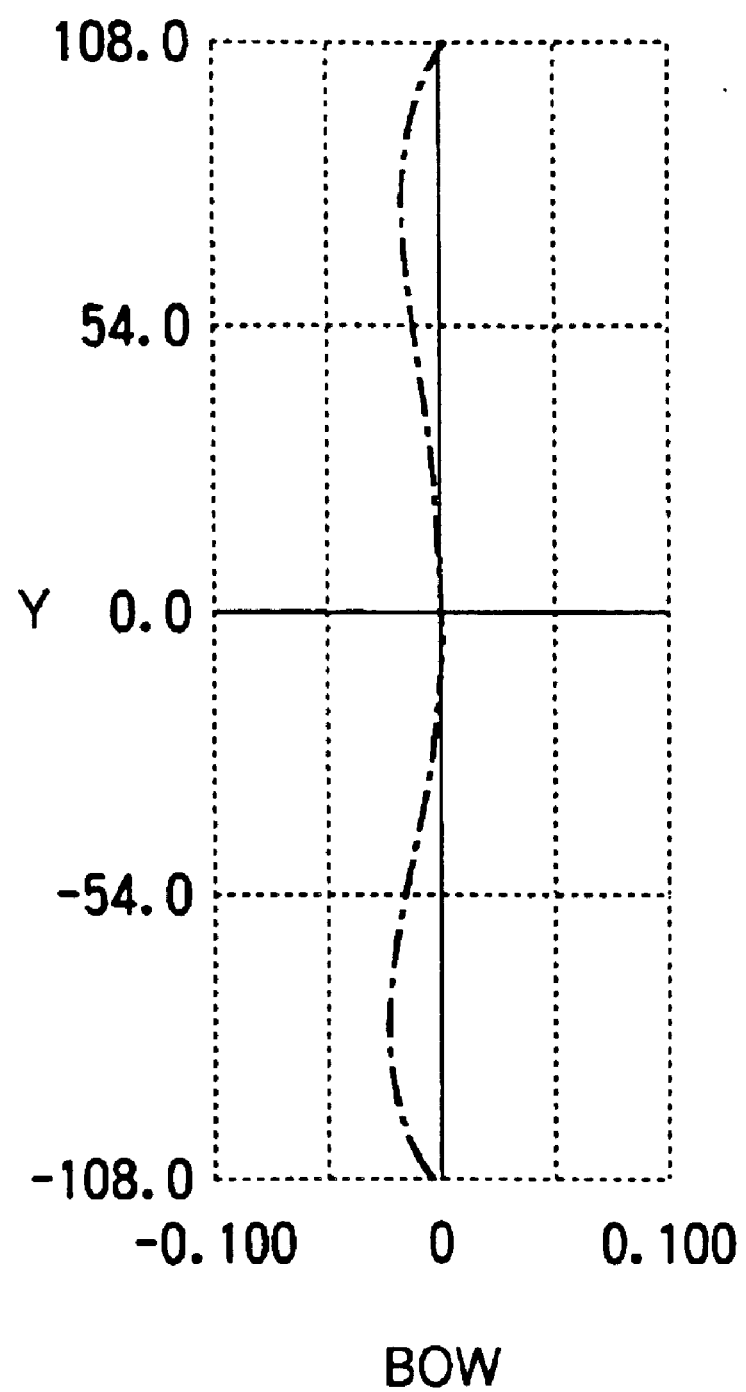
FIG. 11 is a graph illustrating a bow as optical performance of the scanning optical system of the third example.

FIG. 11 is a graph illustrating a bow (i.e., a curve of the scan line on the scan target surface S) as optical performance of the scanning optical system 103 of the third example. As can be seen from FIG. 11, the bow is sufficiently suppressed in the scanning optical system 103 of the third example.

FOURTH EXAMPLE

Figure 12:
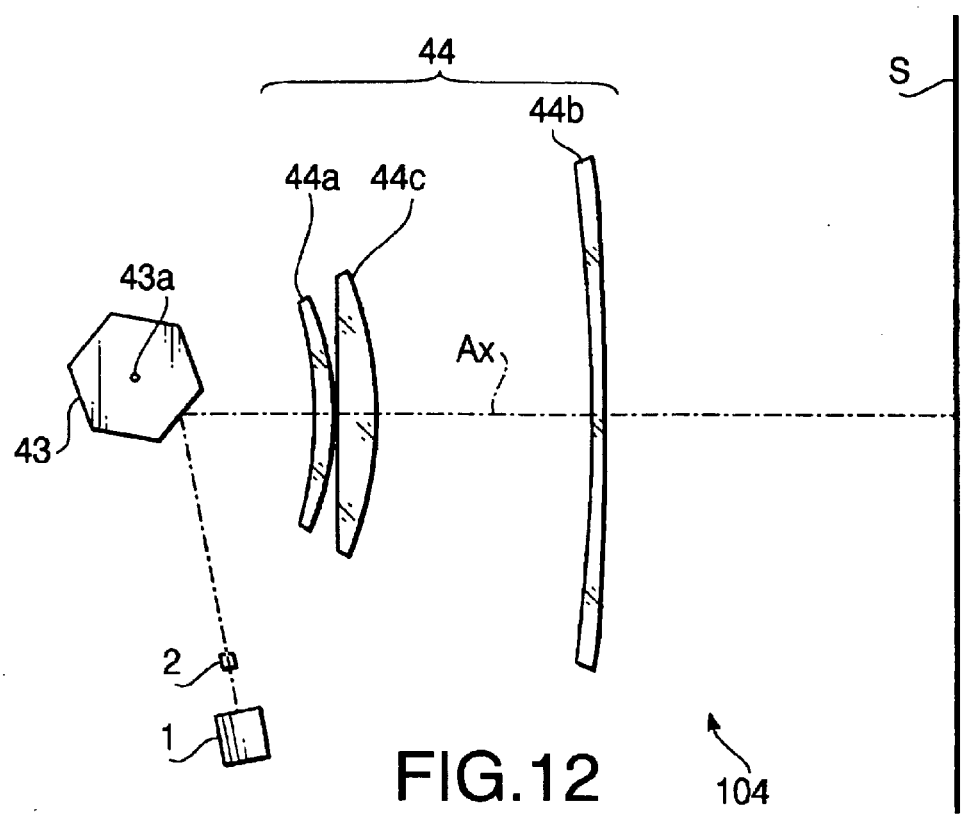
FIG. 12 shows an optical block diagram of a scanning optical system according to a fourth example of the embodiment of the invention viewed along a line parallel with the auxiliary scanning direction.
Figure 13:
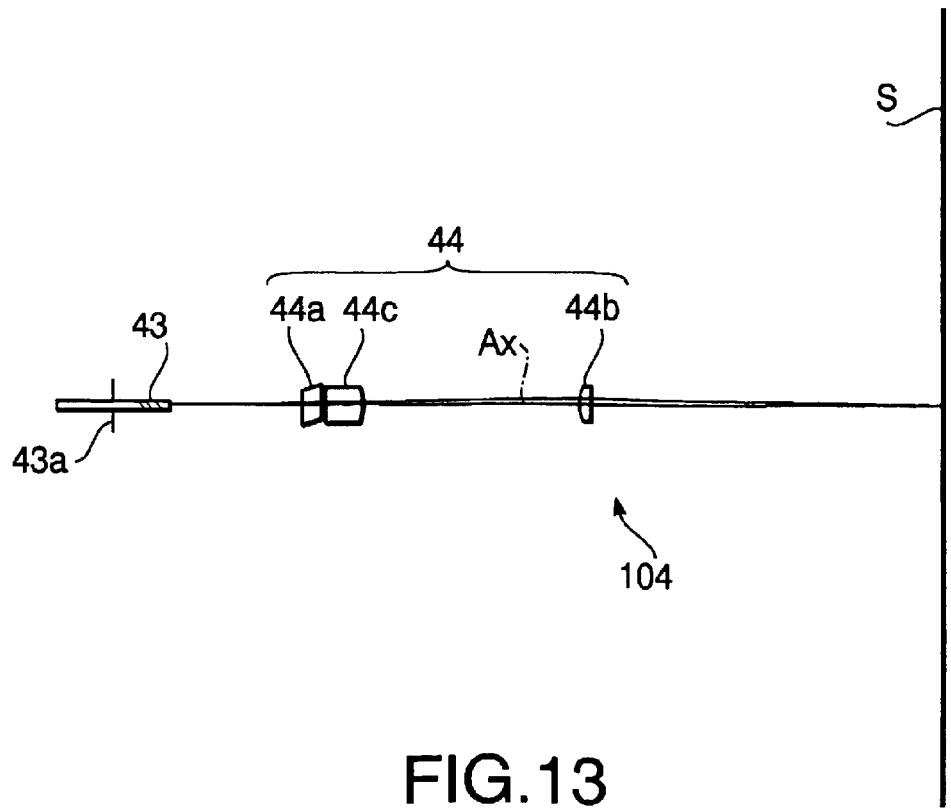
FIG. 13 shows an optical block diagram of the scanning optical system of the fourth example when it is viewed along a line perpendicular to the auxiliary scanning direction.

FIG. 12 shows an optical block diagram of a scanning optical system 104 according to a fourth example of the embodiment of the invention viewed along a line parallel with the auxiliary scanning direction. FIG. 13 shows the optical block diagram of the scanning optical system 104 when it is viewed along a line perpendicular to the auxiliary scanning direction. In FIGS. 12 and 13, to elements which are similar to those in FIG. 1, the same reference numbers are assigned, and the detailed description thereof will not be repeated.

As shown in FIGS. 12 and 13, the scanning lens 44 has a first plastic lens 44a, a second plastic lens 44b, and a glass lens 44c located between the first plastic lens 44a and the second plastic 44b.

TABLE 13 shows a concrete numerical configuration of the scanning optical system 104 from the cylindrical lens 2 through the scan target surface S.

TABLE 13

| No. | Ry | Rz | d | n | z |
|-----|-----|-----|-----|-----|-----|
| #1 | ∞ | 53.63 | 4.2 | 1.51072 | 4 mm |
| #2 | ∞ | ∞ | 102 | | 4 mm |
| #3 | ∞ | ∞ | 55 | | 2 mm |
| #4 | −172.296 | | 7.5 | 1.48617 | 7 mm |
| #5 | −122.146 | 42.976 | 2 | | 7 mm |
| #6 | ∞ | | 16 | 1.51072 | 7 mm |
| #7 | −164.18 | | 90 | | 7 mm |
| #8 | −544.752 | | 5 | 1.48617 | 7 mm |
| #9 | −1283.411 | | 149.127 | | 7 mm |

In Table 13, #1 and #2 denote the front surface and a rear surface (a beam emerging surface) of the cylindrical lens 2, respectively. The #3 denotes the reflective surface of the polygonal mirror 13. The #4 and #5 denote a front surface (a polygonal mirror side) and a rear surface (a scan target surface side) of the first plastic lens 44a, respectively. The #6 and #7 denote a front surface and a rear surface of a glass lens 14c, respectively. The #8 and #9 denote a front surface and a rear surface of the second plastic lens 44b, respectively.

In the fourth example, the front surface (#4) and a rear surface (#5) of the first plastic lens 44a and the rear surface (#9) of the second plastic lens 44b are formed to be rotationally symmetrical aspherical surfaces, respectively. The front surface (#8) of the second plastic lens 44b is formed to be an anamorphic aspherical surface. The front surface (#6) and the rear surface (#7) of the glass lens 44b are configured to be a flat surface and a spherical surface, respectively.

Aspherical coefficients of the surfaces #4, #5 and #9 are indicated in Table 14. The other aspherical coefficients which are not shown in Table 14 are all zero. The conical coefficient of each of the surfaces #4, #5 and #9 is zero.

TABLE 14

| | #4 | #5 | #9 |
|-----|-----|-----|-----|
| $A_4$ | $-1.1742 \times 10^{-7}$ | $1.72283 \times 10^{-8}$ | $4.58186 \times 10^{-8}$ |
| $A_6$ | $2.88406 \times 10^{-11}$ | $1.03907 \times 10^{-11}$ | $-4.11101 \times 10^{-12}$ |
| $A_8$ | $3.66085 \times 10^{-11}$ | $3.43441 \times 10^{-16}$ | $-5.04548 \times 10^{-19}$ |

Values of coefficients of the front surface (#8) of the second plastic lens 44b are indicated in Table 15. The other coefficients which are not shown in Table 15 are all zero. The conical coefficient of the surface #8 is zero.

TABLE 15

| surface #8 | | | |
|-----|-----|-----|-----|
| $AM_1 =$ | 0 | $AS_1 =$ | $-1.42805 \times 10^{-6}$ |
| $AM_2 =$ | 0 | $AS_2 =$ | $-3.02811 \times 10^{-7}$ |
| $AM_3 =$ | 0 | $AS_3 =$ | $-5.27633 \times 10^{-12}$ |
| $AM_4 =$ | $9.07409 \times 10^{-08}$ | $AS_4 =$ | $-2.95311 \times 10^{-11}$ |
| $AM_5 =$ | 0 | $AS_5 =$ | 0 |
| $AM_6 =$ | $-5.69902 \times 10^{-12}$ | $AS_6 =$ | $1.75101 \times 10^{-15}$ |
| $AM_7 =$ | 0 | $AS_7 =$ | 0 |
| $AM_8 =$ | $-2.76542 \times 10^{-19}$ | $AS_8 =$ | $-4.00509 \times 10^{-22}$ |

Table 16 shows amounts of shifting of the origin points A–D of the surfaces #4, #5, #8 and #9 of the first and second plastic lenses 44a and 44b with respect to the principal axis Ax. The amount of shifting has a positive sign when the origin point is shifted upward with respect to the principal axis Ax on FIG. 2, and has a negative sign when the origin point is shifted downward with respect to the principal axis Ax on FIG. 2.

TABLE 16

| SURFACE | AMOUNT OF SHITING OF ORIGIN POINT |
|-----|-----|
| #4 | −2.4 mm |
| #5 | +1.2 mm |
| #8 | 0 mm |
| #9 | +1.2 mm |

The first plastic lens 44a is tilted by 2.00 with respect to a point (which is an intersection of the front surface #4 of the first plastic lens 44a and an optical surface reference axis of the surface #4 when the surface #4 is not shifted and tilted) clockwise on FIG. 13. The second plastic lens 44b is tilted by 0.4° with respect to a point (which is an intersection of the front surface #8 of the second plastic lens 44b and an optical surface reference axis of the surface #8 when the surface #8 is not shifted and tilted) counterclockwise on FIG. 13.

In this example, Za [mm] (which is a distance between the center of curvature E of the anamorphic aspherical surface #8 of the second plastic lens 44b and the principal axis Ax in the auxiliary scanning direction) takes a value of 0.30 mm. Ha [mm] (which is a distance between a point at which an central axis of the beam passing through the second plastic lens 44b interests with the anamorphich aspherical surface #8 and the principal axis Ax in the auxiliary scanning direction) takes a value of 0.89 mm. Since in this case −0.11 mm<0.30 mm<1.89 mm holds, the scanning optical system 104 of the fourth example satisfies the condition (1).

With regard to values of u2 and u4 that relate to the refraction of the beam in the auxiliary scanning direction, u2 (which is an angle formed between a central axis of the beam being incident on the second plastic lens 44b and the principal axis Ax in the auxiliary scanning direction) takes a value of 0.13°, and u4 (which is an angle formed between a central axis of the beam emerged from the second plastic lens 44b and the principal axis Ax in the auxiliary scanning direction) takes a value of −0.06°. Since in this case u4/u2 (−0.06/0.13)=−0.46, the fourth example satisfies the condition (2).

In this example, the polygonal mirror 43 has a form of a flat prism and has a bottom (top) surface having a regular hexagonal form whose radius of a circumscribed circle circumscribing the bottom surface is 46 mm. The polygonal mirror 43 has a thickness of 4 mm in the auxiliary scanning direction. A focal length of the scanning lens 44 is 250 mm, and a scanning width on the scan target surface S is 350 mm.

The lateral magnification m of the scanning lens 44 in the auxiliary scanning direction is −1.138. In this case, −1.3<−1.138<−0.6 holds. Accordingly, the scanning optical system 104 of the fourth example satisfies the condition (3).

The scanning optical system 104 of the fourth example satisfies a condition:

$$d1 \leq d0 \times 0.1 \qquad (4)$$

where d0 represents a distance between the first plastic lens 44a and the second plastic lens 44b, and d1 represents a distance between the first plastic lens 44a and the glass lens 44c. When a plurality of glass lenses are provided between the first plastic lens 44a and the second plastic lens 44b, the distance d1 represents a distance between the first plastic lens 44a and one of the plurality of glass lenses located nearest to the scan target surface S.

When the condition (4) is satisfied, it is prevented that a height of the beam being incident on the glass lens 44c from an optical axis of the glass lens 44c In the auxiliary scanning direction becomes too great. That is, when the condition (4) is satisfied, occurrence of aberration by the glass lens 44c can be prevented. Further, it is prevented that the beam is excessively refracted by the glass lens in a direction in which the beam moves closer to the principal axis Ax.

In this example, dl is 2 mm, and d0 is 108 mm. Therefore, the scanning optical system 104 satisfies the condition (4).

Figure 14:
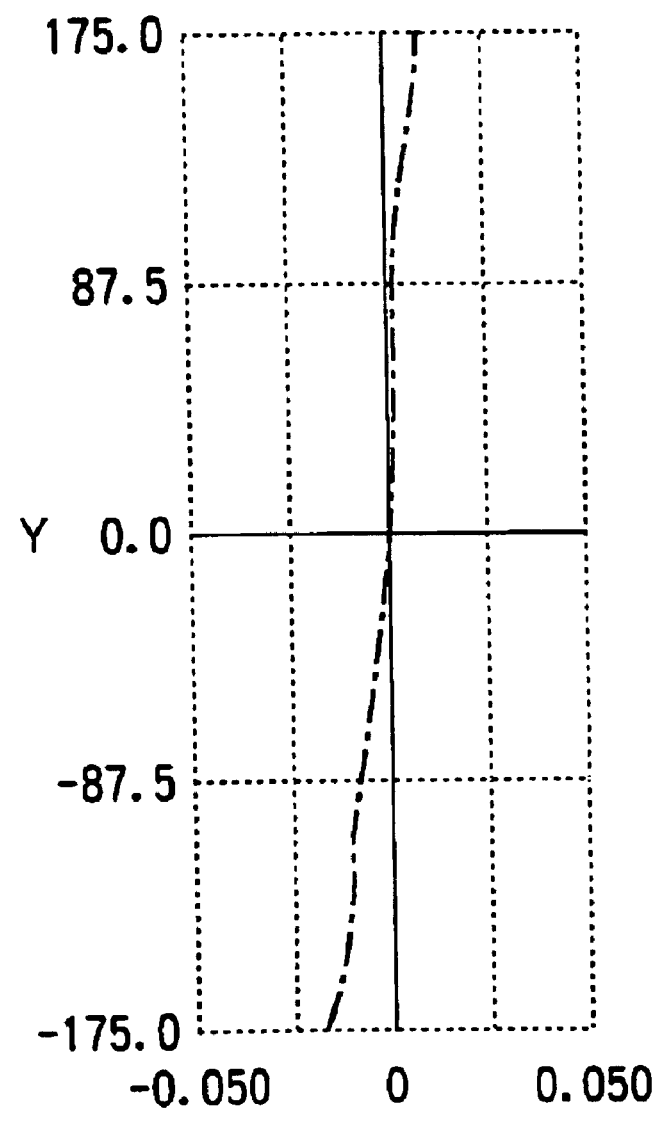
FIG. 14 is a graph illustrating a bow as optical performance of the fourth example.

FIG. 14 is a graph illustrating a bow (i.e., the curve of the scan line on the scan target surface S) as optical performance of the fourth example. As can be seen from FIG. 14, the bow is sufficiently suppressed in the scanning optical system 104 of the fourth example.

As described above according to the embodiment of the invention, the ghost light beam can be effectively removed without tilting or shifting an optical surface reference axis of a lens surface in the imaging optical system by a large amount.

Although the present invention has been described in considerable detail with reference to certain preferred embodiments thereof, other embodiments are possible.

The present disclosure relates to the subject matter contained in Japanese Patent Application No. P2003-040686, filed on Feb. 19, 2003, which is expressly incorporated herein by reference in its entirety.

What is claimed is:

1. A scanning optical system for emitting a laser beam scanning in a main scanning direction on a scan target surface; comprising:

a light source that emits the laser beam;

a deflector that dynamically deflects the laser beam emitted by the light source within a predetermined scanning range; and an imaging optical system that converges the deflected laser beam on the scan target surface to form a beam spot scanning in the main scanning direction, wherein said imaging optical system comprises:

a first plastic lens having a front surface located on a light source side and a rear surface located on a scan target surface side, said first plastic lens being configured such that origin points of the front and rear surfaces of said first plastic lens are located on opposite sides of a principal axis with regard to an auxiliary scanning direction which is perpendicular to the main scanning direction, an amount of shifting of each of the origin points of said first plastic lens with respect to the principal axis is less than half of a diameter of mirror-finished area of corresponding one of the front and rear surfaces of said first plastic lens, and both of centers of curvature of the front and rear surfaces of said first plastic lens on the respective origin points are positioned on the light source side of said first plastic lens; and a second plastic lens having a front surface located on the light source side and a rear surface located on the scan target surface side, at least one of the front and rear surfaces of said second plastic lens having an anamorphic aspherical surface, at least one of origin points of the front and rear surfaces of said second plastic lens being located on the same side of the principal axis as the origin point of the rear surface of said first plastic lens in the auxiliary scanning direction, an amount of shifting of each of the origin points of said second plastic lens with respect to the principal axis being less than half of a diameter of mirror-finished area of corresponding one of the front and rear surfaces of said second plastic lens in the auxiliary scanning direction, wherein said second plastic lens is located on the scan target surface side with respect to said first plastic lens, wherein the principal axis corresponds to an extension of a center axis of the laser beam lying between said deflector and said imaging optical system when the center axis is viewed along a line perpendicular to the auxiliary scanning direction.

2. The scanning optical system according to claim 1;

wherein, with regard to the auxiliary scanning direction, said first plastic lens is configured such that a distance from the origin point of the rear surface to the principal axis is larger than a distance from an intersection of the rear surface and the laser beam passing through said first plastic lens to the principal axis.

3. The scanning optical system according to claim 1, wherein said second plastic lens satisfies a condition:

$$Ha-1 \,[mm] < Za \,[mm] < Ha+1 \,[mm] \qquad (1)$$

where Za [mm] represents a distance in the auxiliary scanning direction from the principal axis to a center of curvature of one of the front and rear surfaces of said second plastic lens configured to be the anamorphic aspherical surface on its origin point, and Ha represents a distance in the auxiliary scanning direction from the principal axis to a point at which a central axis of the laser beam passing through said second plastic lens interests with the anamorphic aspherical surface.

4. The scanning optical system according to claim 3, wherein said imaging optical system satisfies a condition:

$$u'/u < 1 \qquad (2)$$

where u represents an angle formed in the auxiliary scanning direction between the principal axis and a central axis of the laser beam being incident on said second plastic lens, u' represents an angle formed in the auxiliary scanning direction between the principal axis and a central axis of the laser beam emerging from said second plastic lens.

5. The scanning optical system according to claim 4, wherein the amounts of shifting of the origin points of the front and rear surfaces of said second plastic lens with respect to the principal axis are different from each other.

6. The scanning optical system according to claim 5, wherein said imaging optical system satisfies a condition:

$$-1.3 < m < -0.6 \qquad (3)$$

where m represents a lateral magnification of said imaging optical system in the auxiliary scanning direction.

7. The scanning optical system according to claim 1, wherein said imaging optical system includes at least one glass lens located between said first plastic lens and said second plastic lens, wherein said imaging optical system satisfies a condition:

$$d1 \leq d0 \times 0.1 \qquad (4)$$

where d0 represents a distance between said first plastic lens and said second plastic lens, and d1 represents a distance between said first plastic lens and said at least one glass lens.

8. The scanning optical system according to claim 7, wherein said at least one glass lens includes a plurality of glass lenses, wherein the distance d1 represents a distance between said first plastic lens and one of the plurality of glass lenses located nearest to the scan target surface.

* * * * *